May 18, 1948. R. J. KIRKBY 2,441,706
DISPENSING APPARATUS
Filed Dec. 17, 1945 5 Sheets-Sheet 2

Inventor
Raymond J. Kirkby
By R. S. Berry
Attorney

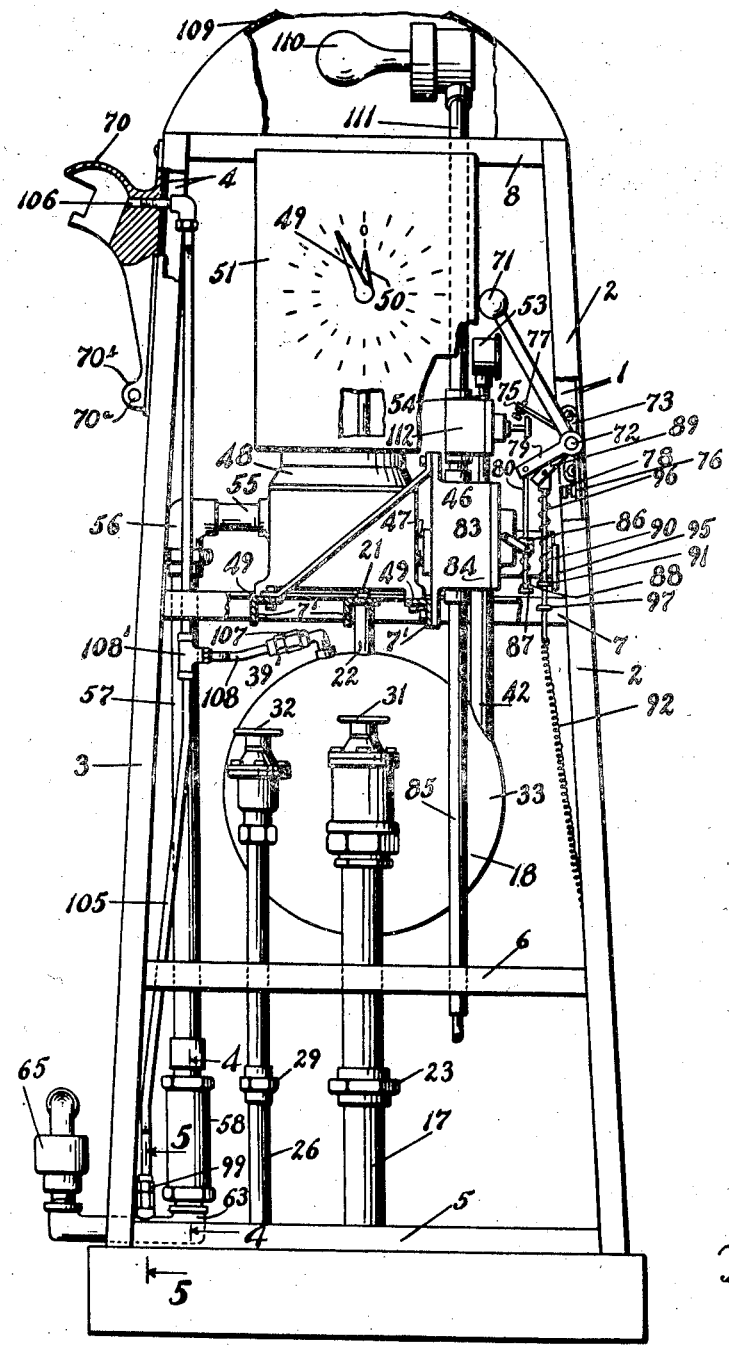

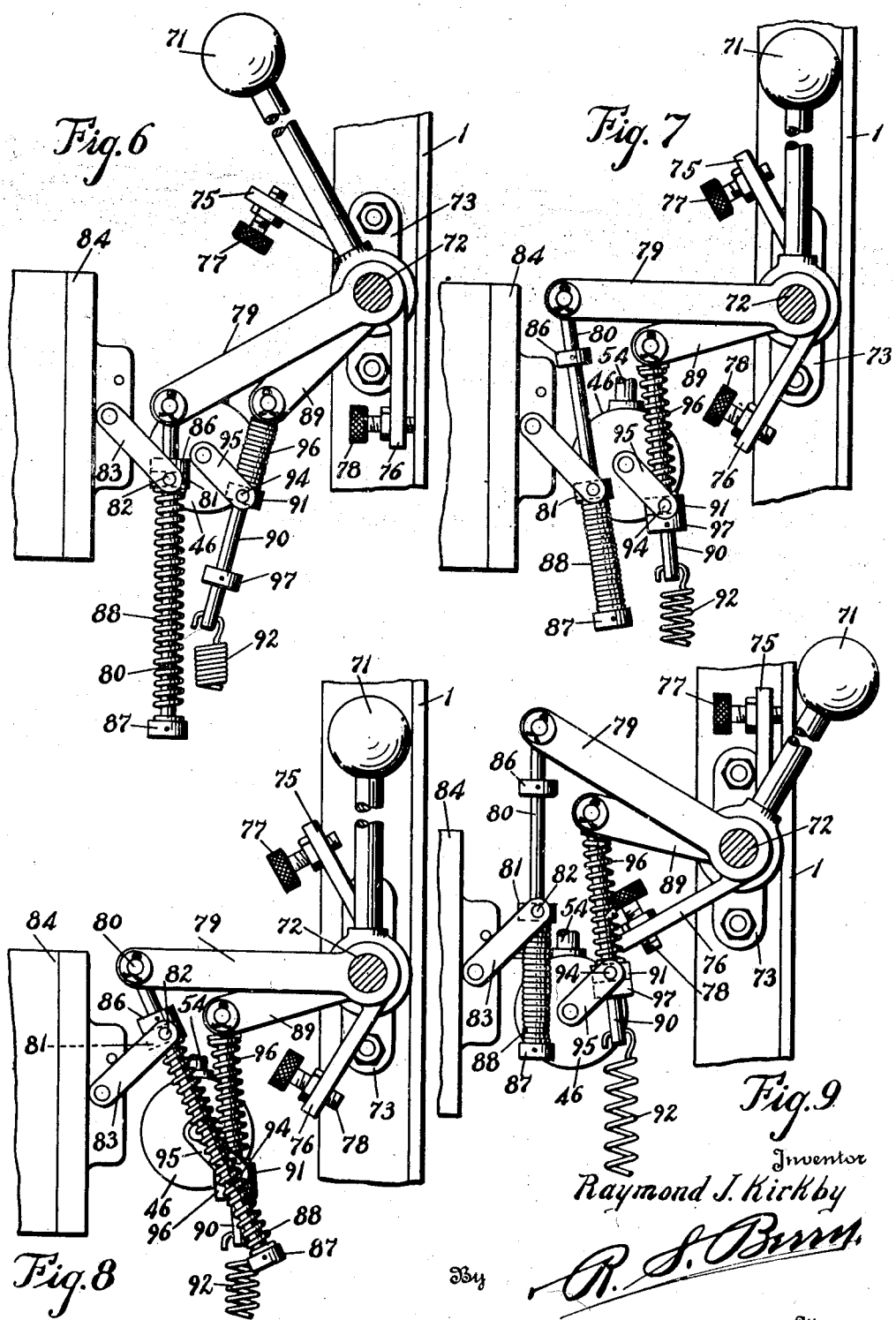

May 18, 1948.  R. J. KIRKBY  2,441,706
DISPENSING APPARATUS
Filed Dec. 17, 1945  5 Sheets-Sheet 5

Inventor
Raymond J. Kirkby
By R. S. Brunt
Attorney

Patented May 18, 1948

2,441,706

UNITED STATES PATENT OFFICE 2,441,706

DISPENSING APPARATUS

Raymond J. Kirkby, Sherman Oaks, Calif., assignor to Adel Precision Products Corp., a corporation of California Application December 17, 1945, Serial No. 635,544

6 Claims. (Cl. 62—1)

This invention relates to dispensing apparatus for highly volatile fluids of which liquefied petroleum gases such as butane and propane or mixtures thereof are representative. These liquids are used as fuel for internal combustion motors and due to their low boiling points (—47° F. to —32° F.) they must be maintained under sufficient pressure to keep them in the form of liquid not only for the purpose of storage but so that they may be accurately metered. In average temperatures (50° to 90° F.) these pressures will be from 100 p. s. i. upward. Because of these factors the dispensing of these highly volatile and explosive fluids presents problems not encountered in dispensing less volatile fluids and dispensing devices heretofore employed have been largely of the "home made" variety some of which, while having adequate safeguards against all possible dangers, are unnecessarily complicated in the required sequence of operations and others while simpler to operate, neglect proper safeguards against excessive pressures and the like with consequent ever present possibilities of disastrous explosions and fire hazards.

In an effort to meet the various problems involved, it is an object of this invention to provide a dispensing apparatus for liquefied petroleum gases and other highly volatile liquids which will be as simple to operate as the conventional gasoline dispensing pump.

A second object of the invention is to provide a dispensing apparatus of the character described in which means is provided for insuring that liquid only will pass through the metering apparatus.

A third object of the invention is to provide a dispensing apparatus of the character described which is simple in construction and mode of operation so that it may be operated safely by persons not having any special skill with respect to the fluids being handled.

Still another object of the invention is to provide a dispensing apparatus of the character described in which is incorporated pressure relieving means constructed and arranged to relieve excess pressures in all cavities within the dispensing means regardless of the open or closed positions of the various valves in the fluid lines.

A still further object of the invention is to provide a dispensing apparatus of the above character in which only a single manual control element is provided which element is shiftable first to start the pumping means and then to permit the flow of fluid through the meter and tank hose after the pressure has been raised to a point insuring the complete liquefication of any gas that may have formed.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 3 is a side elevation of the apparatus from the left hand side as viewed in Fig. 2; the cover plate being removed and certain portions being broken away for clearness of illustration.

Fig. 4 is an enlarged sectional view of one of the valve elements, the section being taken on the line 4—4 of Fig. 3.

Fig. 5 is an enlarged sectional view of another valve element, the section being taken on the line 5—5 of Fig. 3.

Figs. 6, 7, 8, and 9 are enlarged views of the control apparatus in the various positions incident to operation and control.

Figure 10:
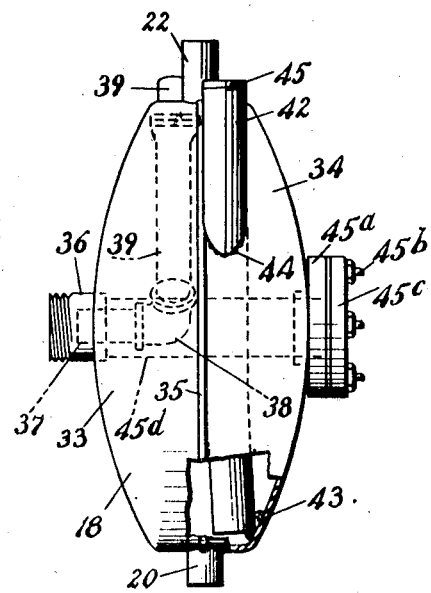

Fig. 10 is an edge elevation of the vapor separator tank which forms one element of the apparatus a portion of the wall being broken away to illustrate details of interior construction.

Figure 12:
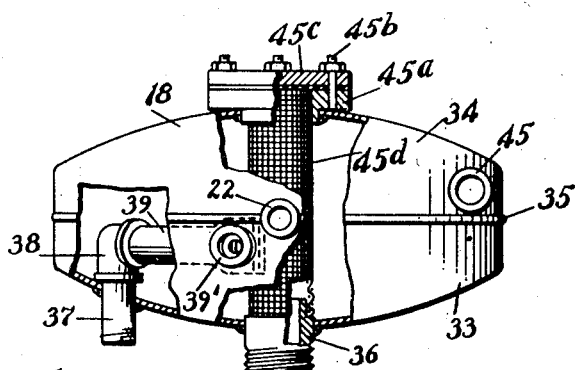
Figure 11:
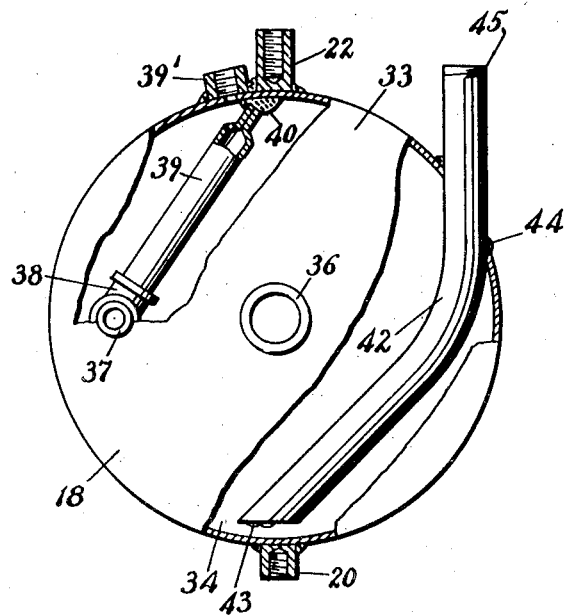

Fig. 11 is a left hand side elevation of Fig. 10, portions of the wall being broken away to show details of construction, and Fig. 12 is a top plan view of Fig. 10 other portions of the wall being broken away to show still other details of interior construction.

Figure 1:
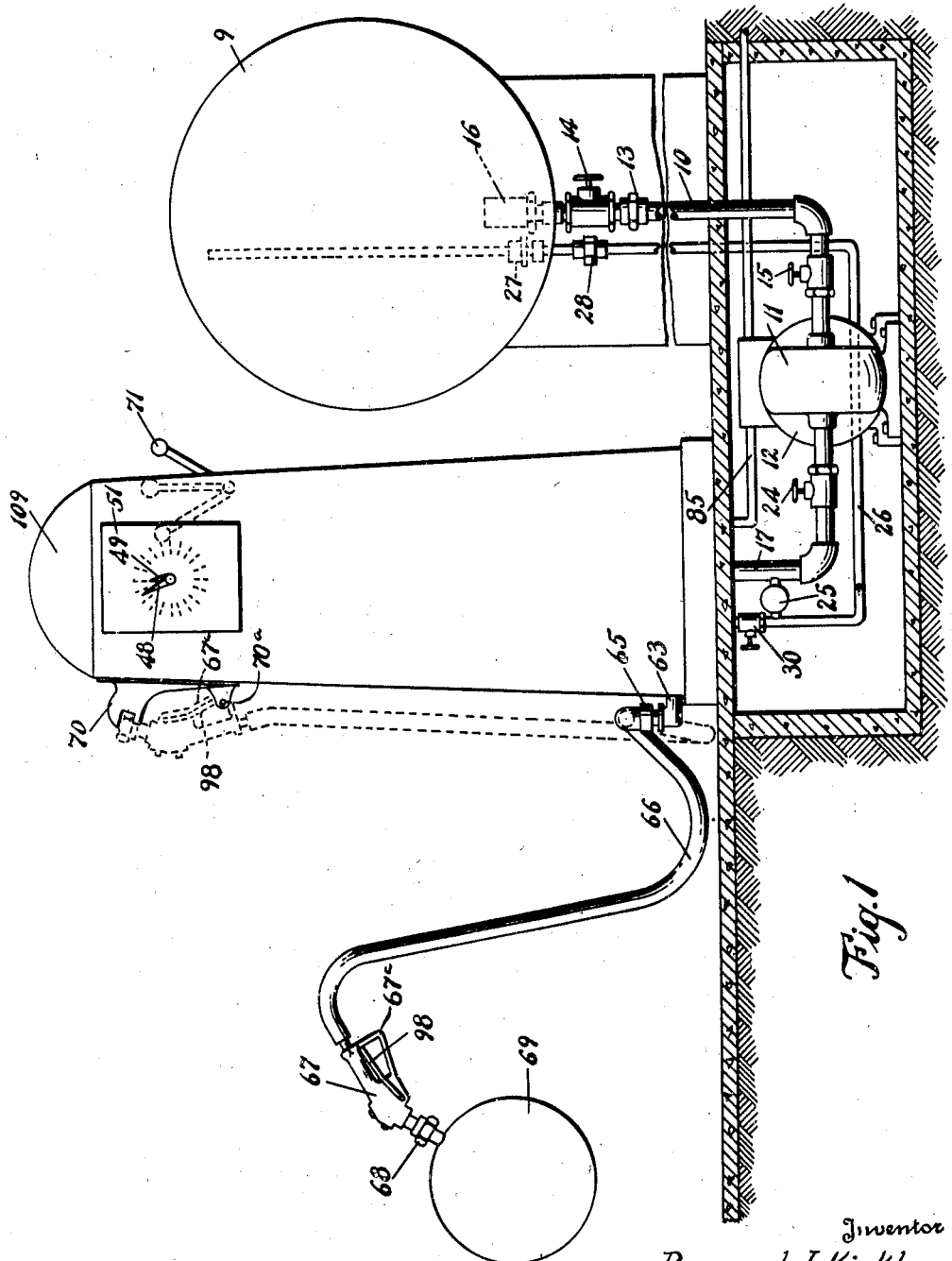
Fig. 1 is a somewhat diagrammatic view of a dispensing system employing the dispensing apparatus forming the subject matter of this invention.

In the embodiment illustrated, the apparatus is mounted in a frame structure formed of angle iron elements riveted or welded together and comprising four leg or corner elements 1, 2, 3, and 4 which elements are connected by a series of rectangular frames 5, 6, 7, and 8. Preferably, for the sake of appearance, the corner elements may be slightly inclined towards each other. Also the mechanism mounted within the frame may be concealed by sides of sheet metal or the like as shown in Fig. 1. The rectangular frame members 6 and 7 further include cross members 6' and 7' on which certain elements of the apparatus are mounted as will hereinafter be specifically described.

Referring to Fig. 1 there is shown a typical dispensing system with which the apparatus is used which includes a storage tank 9 connected by a line 10 with the intake side of a pump 11 connected to and operated by a motor 12. Preferably the line 10 includes a union connection 13 to permit disconnection, and valves 14 and 15 between the union 13 and the tank and between the union and the pump respectively to confine the fluid on either side in the event of disconnection. Additionally, within the tank, the line 10 terminates in an excess flow-preventing check valve 16 to confine the contents in the event of any accidental opening of the system as by rupture of any part of the system. The discharge side of the pump 11 is connected by a line 17 to a vapor separator tank 18 mounted on one of the cross members 6' of the frame member 6 by a bolt 19 threaded into a lug 20 on the tank 18, and further secured in position by a bolt 21 passing through one of the cross members 7' of the cross frame 7 and threaded into a lug 22 on the tank 18. The line 17 in the region of the dispensing apparatus is provided with a union connection 23 and between the union and the pump 11 is further provided with a shut-off valve 24 to permit disconnection of the pump and dispenser with a minimum loss of fluid from the storage tank. Between the union 23 and the valve 24 the line is connected to the inlet side of a pressure relief valve 25 whereof the outlet side is connected to a vapor return line 26 which extends from the vapor separator tank 18 to the upper interior of the storage tank 9, within which it terminates in an excess flow-preventing check valve 27. Adjacent the storage tank 9 the line 26 is provided with a union connection 28 to permit disconnection of the storage tank from the system. Additionally, the line 26, between the connection therewith of the pressure relief valve 25 and the vapor separator tank 18 is provided with a union connection 29 to permit disconnection of the dispenser from the system. A shut-off valve 30 is located between the union and the outlet port of the relief valve 25 to prevent the escape of vapor when the dispenser is connected.

As here shown in Fig. 1 the storage tank is an overhead tank and the motor and pump are located in a pit. This is the usual arrangement but is not absolutely necessary as either the pump or tank may be above or below ground as may be desired.

Referring now specifically to the dispenser of which the vapor separator tank above referred to forms a part, the line 17, adjacent its connection with the vapor separator tank, is provided with a third shut-off valve 31 to prevent the escape of fluid from the dispenser in the event of disconnection of the union 23. Also the line 26 adjacent its connection with the vapor separator tank 18 is provided with a shut-off valve 32 adapted to prevent the escape of vapor from the dispenser in the event of disconnection of the union connection 29.

Referring now to Figs. 10, 11 and 12, the vapor separator tank 18 may be economically formed of a pair of circular pressed steel tank heads 33, 34 welded together along a peripheral medial line 35. Prior to assembly, the head 33 has welded thereto an axially disposed inlet nipple 36 which projects outwardly and is threaded for connection to the valve 31 thereby forming part of the line 17. Also, prior to assembly of the tank heads, the head 33 is provided with a connection for the vapor return line 26 comprising a nipple 37 welded into and extending laterally from the tank head which nipple within the tank head carries an elbow 38, the other end of which carries a short length of pipe 39 extending to a point adjacent the upper side wall of the head 33 at which point it is flattened and secured to the interior side wall of the tank head by a weld 40. Adjacent the flattened end portion the pipe 39 is provided with a port 41 affording communication between the interior of the tank 18 and the pipe 39. The outwardly extending end of the nipple 37 is threaded for connection with the shut-off valve 32 and thus the nipple 37, elbow 38 and pipe 39 form a part of the vapor return line 26.

Additionally the tank head 33 is provided with an outwardly extending internally threaded port 39' adapted to be connected to a vapor escape line hereinafter to be described in detail.

Prior to its assembly to the tank head 33, the tank head 34 is provided with a discharge pipe 42 extending from the lower portion of the tank to which it is welded at 43, through the sidewall of the tank head to which it is welded at 44 and terminating in a threaded end 45 affording a means of connection to other portions of the dispenser to be hereinafter described in detail. Additionally, the tank head 34 has welded thereto a flange element 45ª provided with outwardly projecting studs 45ᵇ to which a cylindrical screen 45ᵈ may be secured. The end of the screen 45ª is in registry with the nipple 36 and the screen thus operates to catch any foreign matter contained in the fluid.

The threaded end 45 of the vapor separator tank 18 is connected to one side of a shut-off valve 46, the other side of which is connected by a nipple 47 with the inlet side of a meter apparatus 48 secured to the cross members 7' of the cross frame 7 by a series of bolts 49. The meter 48 is a conventional meter and includes indicating means including conventional rotating pointers 49 and 50 on opposite sides of the dispenser which cooperate with suitable dials 51, 51 to indicate the amount of fluid passing through the meter. Since this meter is of a type which may be purchased on the open market further description is not thought to be necessary.

The valve 46 is preferably of the quick closing type disclosed in my co-pending patent application, Serial Number 588,690, filed April 16, 1945 now abandoned. The valve further is preferably provided with an internally threaded port 52 to which a pressure gauge 53 may be attached by means of a short pipe 54. The gauge faces the operating side of the dispenser and is observable by the operator during dispensing operation for purposes to be described in connection with the operation of the apparatus.

The discharge side of the meter 48 is connected by means of a discharge line comprising a nipple 55, an elbow 56 and a depending pipe 57 with the inlet side of a combined flow check and excess flow preventing-valve assembly 58. This assembly, as shown in Fig. 4, is preferably of the type described and claimed in my co-pending application, Serial Number 588,689 filed April 16, 1945 now abandoned, which assembly comprises a body member 59, having mounted therein a normally closed, flow-responsive spring seated check valve member 60 and an excess-flow-preventing valve element 61 normally held open by a spring 62. The outlet side of the valve assembly 58 is connected to one end of a return bend element 63 secured to one side of the cross frame member 5 by bolts 64'. The other end of the return bend element is connected by a swivel joint 65 to one end of a dispensing hose 66 which at its other end is provided with a dispensing nozzle 67 provided with a manually operable shut-off valve and a coupling 68 for making a suitable connection with the vehicle tank 69 or other receptacle to be filled. I prefer to employ a so-called "trip free" nozzle of the type described and claimed in my co-pending application Serial Number 581,319, filed March 6, 1945, although other types of valves and nozzles may be employed. The use of such other nozzles and valves will entail fluid losses and difficulties in disconnecting the dispensing nozzle from the receiving tank which are eliminated by the use of the above preferred nozzle. When not in use, the nozzle may be hung from a bracket member 70 fixed to the side of the dispenser, preferably above the return bend member 63 and secured in place by a locking bolt 70ª.

The controlling device for the dispensing mechanism comprises a hand lever 71 fixed to a rock shaft 72 journaled in bearing members 73 and 74 fixed to the opposed inner faces of the corner elements 1 and 2 respectively. The shaft 72 has fixed thereto a pair of radially projecting arms 75 and 76 provided with adjustable stop screws 77 and 78 respectively, which screws are so disposed as to be engageable with an inner face of the corner member 1 to adjustably limit the extent of movement of the shaft 72.

Fixed to the shaft 72 is a third radially projecting arm 79 to the free end of which one end of a rod 80 is pivotally connected. Intermediate its ends the rod is slidably mounted in a collar 81 which collar is pivotally mounted at 82 on the free end of the operating arm 83 of an explosion proof electric switch mechanism 84 which, through suitable connections extending through the conduit 85, controls the operation of the pump motor 12. Fixed to the rod 80 between the arm 79 and the collar 81 is a stop collar 86, and at the opposite side of the collar 82 the end of the rod 80 is provided with a collar 87 which serves as an abutment for one end of a compression spring 88 surrounding the rod 80, which spring at its other end, engages one face of the collar 82.

Also fixed to the shaft 72 is a fourth radially extending arm 89 the free end of which is pivotally connected to one end at a rod 90, which rod is slidably mounted in a collar 91 and at its other end is connected to one end of a tension spring 92 the other end of which is connected to the frame structure at 93. The tension of the spring tends normally to rock the shaft in a counter clockwise direction as viewed in Figs. 3, 6, 7, 8 and 9 as far as the arm 76 and stop screw 78 will permit. The collar 91 is pivotally connected at 94 to the free end of the operating arm 95 of the valve 46 and surrounding the rod 90 between the collar 91 and its point of connection with the arm 89 is a compression spring 96. Also fixed to the rod 90 adjacent the end connected to the spring 92 is a stop collar 97.

Figure 2:
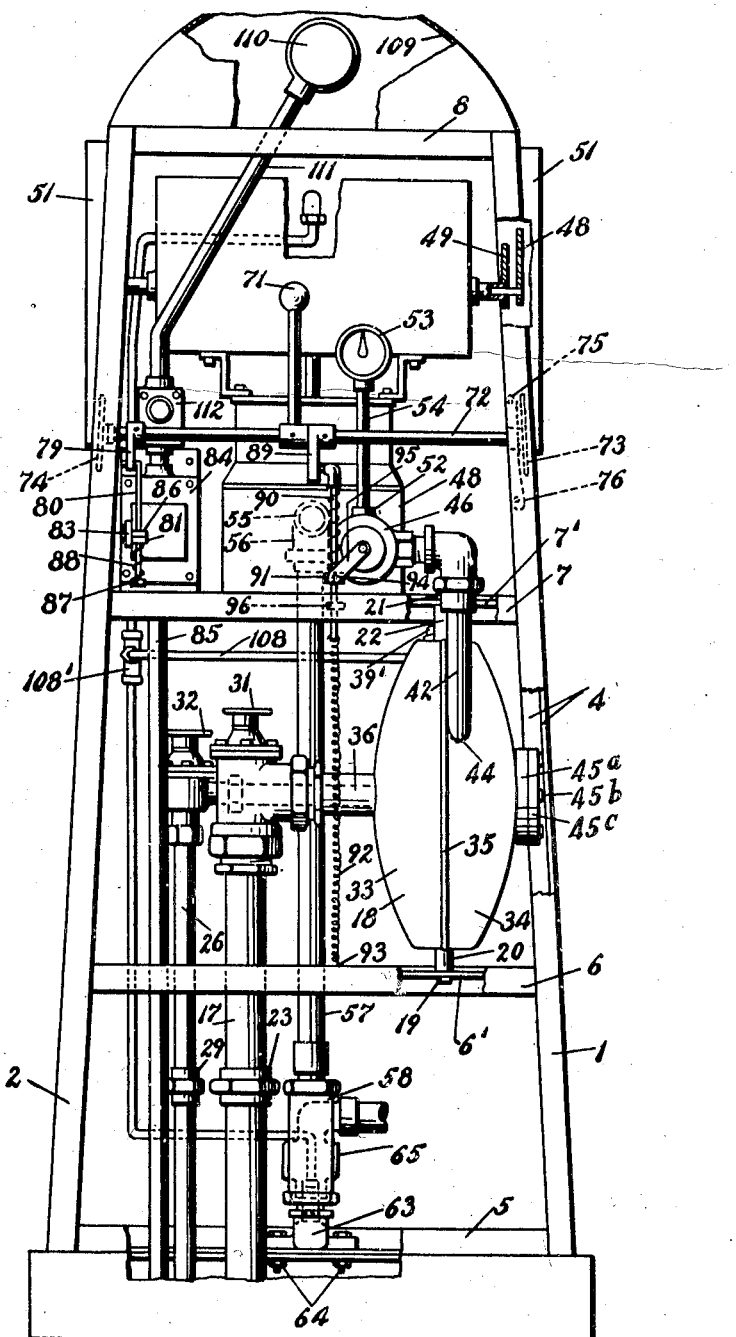
Fig. 2 is a side elevation of the dispensing apparatus as viewed from the operating side; the cover plate being removed from the housing and portions being partially broken away for clearness of illustration.

The mode of operation of the control devices is most clearly shown in Figs. 6 to 9 inclusive. In these figures the valve 46 is shown turned at right angles to the position occupied in Figs. 2 and 3 for clearness of illustration, but it will be appreciated that the device will operate with the valve in either position.

Assuming that the apparatus is at rest and it is desired to begin a dispensing operation, the nozzle 67 is first connected to the tank to be filled and the nozzle valve mechanism controlled by the valve handle 98 is opened. The operator then grasps the hand lever 71 and moves it to turn the shaft in a clockwise direction as viewed in these figures extending the spring 92 and effecting a gradual compression of the spring 88 and permitting a gradual extension of the spring 96 until a point approximately like that shown in Fig. 7 is reached, at which time the power stored in the spring 88 is sufficient to overcome the resistance of the switch mechanism, whereupon the spring will snap the switch to the closed position as shown in Fig. 8 starting the motor and pump. The operator then watches the gauge 53 and when the pressure registered thereon is sufficiently high to insure that all vapor has been collapsed the hand lever is moved to the position shown in Fig. 9 limited by the arm 75 and stop screw 77, bringing the stop collar 97 into contact with the collar 91 and carrying it with it opening the valve 46 and permitting fluid to flow through the meter 48 and into the receiving tank 69.

When the desired quantity has been dispensed, the spring 92 is permitted to move the shaft in a counterclockwise direction. During the first portion of this movement, the spring 96 engaging the collar 91 will move the valve 46 to closed position. When the valve is closed, the stop collar 86 on the rod 80 will engage the collar 81 and cause the switch 84 to move to open position. Continued movement of the shaft 72 will effect extension of the spring 88 and compression of the spring 96 until the parts return to the position shown in Fig. 6. This successive operation of pump and dispensing valve is necessary to insure that only fluid shall pass through the meter to the end that accurate measurement shall be had. The dispensing operation is continued until either a predetermined amount is registered on the meter or until the tank is filled, at which point the fluid will cease to flow and the meter will cease to register. The pressure relief valve 25 will then function to prevent damage to the dispenser.

Since fluids such as butane and propane have very low boiling points, they have a correspondingly high rate of thermal expansion. When the apparatus is at rest, a quantity of fluid is trapped between the valve 46 and the valve in the nozzle 67. If the dispenser happens to be exposed to the sun the temperature rise could produce a pressure sufficient to rupture the hose 66 or some other portion of the dispenser. To eliminate this danger the dispenser is provided with a pressure relief valve 99 which as shown in Fig. 5, is threaded into the return bend member 63 and comprises a valve body 100 having a valve seat 101 engaged by a valve member 102 normally held seated by a compression spring 103 which abuts against a cap member 104 threaded into the valve body 100 and which cap member is additionally externally threaded to afford connection with a line 105 which terminates at 106 in the bracket member 70 as best shown in Fig. 3. The discharge point is placed in the upper exterior of the dispenser because any gas discharged is a heavy gas and it is desired that it shall be conducted outside the dispenser at a point where it will be diluted with air to an extent at which it is non-inflammable before it reaches the ground. The spring 103 is sufficiently strong to resist opening of the relief valve except at pressures higher than that at which the relief valve 25 will open and consequently there will be no discharge through the relief valve 99 during a dispensing operation.

Also when the dispenser is to be idle over a considerable length of time or when repairs are to be made to some other part of the system, the valves 31 and 32 will be shut off, trapping a quantity of fluid between them and the valve 46 including the fluid in the vapor separator tank 18. To prevent damage arising from an increase of temperature a third pressure relief valve 107 similar in construction to the valve 99 is connected to the port 39' of the vapor separator tank 18. The discharge of this valve enters the line 105 through a pipe 108 and a T connection 108'.

The valve 60 of the valve assembly 58 has a small hole drilled therethrough so that except during the actual flow of fluid therethrough, the pressure on each side thereof is balanced. The strength of the spring which holds it normally closed is such that a pressure of approximately 15 p. s. i. greater than the existing pressure in the line 57 will be required to open it thus preventing the formation of any vapor in the meter while flow of fluid occurs. The excess flow valve 61 is normally open but should any rupture of the hose or nozzle occur at any time the rush of fluid will be sufficient to close it and to hold it closed except for the slight gradual relief occasioned by the small hole drilled through the valve. If desired, the top of the dispenser may be provided with a translucent dome 109 adapted to be illuminated by a light 110 carried at the end of a conduit 111 leading from the switch 84 with an interposed switch 112.

It will be noted that when the nozzle 67 is hung in the bracket 70 that the valve handle 98 is disposed so that the locking bolt 70ᵃ passes first through the hole in a lug formed as a portion of the bracket 70 and thence through the guard loop 67ᵃ surrounding the valve handle 98 and above the valve handle so that the nozzle cannot be removed from the bracket nor the valve handle moved without first removing the bolt 70ᵃ.

Thus it will be seen that there has been provided a dispensing and metering apparatus for highly volatile fluids, which is simple in construction, and, which is both safe and simple in operation. While the illustrated and described embodiment is particularly adapted for the dispensing of butane and propane it will be appreciated that the principles of construction here disclosed may be employed also for the dispensing of other highly volatile fluids or of other liquefied gases.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a dispensing apparatus for liquefied gases and the like, the combination of storage tank, a vapor separator, a meter, and a discharge conduit, a shut-off valve between said storage tank and said vapor separator, a second shut-off valve between said vapor separator and said meter, and a third shut-off valve in said discharge conduit, a pressure relief valve between said first and second shut-off valves, and a second pressure relief valve between said second and third shut-off valves; both of said relief valves discharging into atmosphere exteriorly of said apparatus.

2. In a dispensing apparatus for liquefied gases and the like, the combination of a flow inducing means, a meter and a discharge conduit connected in series, means in said discharge conduit operative automatically to prevent the formation of vapor in said meter while flow of fluid occurs in said conduit and other means in said conduit operable automatically to shut-off the flow of fluid through said conduit when the rate of flow exceeds a predetermined rate.

3. In a dispensing apparatus for liquefied gases and the like, a pump for creating fluid flow, a motor connected to said pump, a switch for controlling said motor, a meter connected to the discharge side of said pump, a shut-off valve between said pump and said meter, a manually operable rock shaft connected by separate trains of mechanism to said switch and said valve; the train of mechanism between said rock shaft and said switch being constructed and arranged first to store up power and then to employ said stored power to close said switch and to permit further movement of said rock shaft to open said valve.

4. In a dispensing apparatus for liquefied gases and the like, a pump for creating fluid flow, a motor connected to said pump, a switch for controlling said motor, a meter connected to the discharge side of said pump, a shut-off valve between said pump and said meter, a manually operable rock shaft connected by separate trains of mechanism to said switch and said valve; the train of mechanism between said rock shaft and said switch, including an arm on said rock shaft, a free ended operating arm on said switch, a collar pivotally mounted on the free end of said switch arm, a rod pivotally mounted on the free end of said rock shaft arm and slidably disposed in said pivoted collar, a stop collar fixed to said rod between said pivoted collar and said rock shaft arm, a stop collar on the free end of said rod and a compression spring extending between said second stop collar and said pivotally mounted collar.

5. In a dispensing apparatus for liquefied gases and the like, a pump for creating fluid flow, a motor connected to said pump, a switch for controlling said motor, a meter connected to the discharge side of said pump, a shut-off valve between said pump and said meter, a manually operable rock shaft connected by separate trains of mechanism to said switch and said valve; the train of mechanism between said rock shaft and said valve including an arm fixed to said rock shaft, a free ended operating arm on said valve, a collar pivotally mounted on the free end of said valve arm, a rod pivotally connected to the free end of said rock shaft arm and slidably engaging said pivotally mounted collar, a shoulder on said rod adjacent said rock shaft arm, a compression spring extending between said shoulder and said pivoted collar and a stop collar at the free end of said rod.

6. In a dispensing apparatus for liquefied gases and the like, a pump for creating fluid flow, a motor connected to said pump, a switch for controlling said motor, a meter connected to the discharge side of said pump, a shut-off valve between said pump and said meter, a manually operable rock shaft connected by separate trains of mechanism to said switch and said valve; the train of mechanism between said rock shaft and said switch, including an arm on said rock shaft, an operating arm on said switch, a collar pivotally mounted on the free end of said switch arm, a rod pivotally mounted on the free end of said rock shaft arm and slidably disposed in said pivoted collar, a stop collar fixed to said rod between said pivoted collar and said rock shaft arm, a stop collar on the free end of said rod, a compression spring extending between said second stop collar and said pivotally mounted collar, and the train of mechanism between said rock shaft and said valve including an arm fixed to said rock shaft, a free ended operating arm on said valve, a collar pivotally mounted on the free end of said valve arm, a rod pivotally connected to the free end of said rock shaft arm and slidably engaging said pivotally mounted collar, a shoulder on said rod adjacent said rock shaft arm, a compression spring extending between said shoulder and said pivoted collar and a stop collar at the free end of said rod.

RAYMOND J. KIRKBY.

REFERENCES CITED

The following references are of record in the file of this patent:

UNITED STATES PATENTS

| Number | Name | Date |
|---|---|---|
| 1,717,274 | Stilwell | June 11, 1929 |
| 1,843,674 | Hinds | Feb. 2, 1932 |
| 1,926,324 | Wolfe | Sept. 12, 1933 |